United States Patent [19]

Fisher et al.

[11] Patent Number: 4,620,277

[45] Date of Patent: Oct. 28, 1986

[54] MULTIMASTER CPU SYSTEM WITH EARLY MEMORY ADDRESSING

[75] Inventors: Jimmie L. Fisher, Phoenix, Ariz.; Mark A. Kovalan, Cedar Rapids; Bryon L. Wiscons, Marion, both of Iowa

[73] Assignee: Rockwell International Corporation, El Segundo, Calif.

[21] Appl. No.: 470,695

[22] Filed: Feb. 28, 1983

[51] Int. Cl.⁴ .......................................... G06F 12/00
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,242,467 | 3/1966 | Lamy | 364/200 |
| 3,601,809 | 8/1971 | Gray et al. | 364/200 |
| 4,032,896 | 6/1977 | Bennett et al. | 364/200 |
| 4,036,287 | 7/1977 | Huang | 364/200 |
| 4,099,231 | 7/1978 | Kotok et al. | 364/200 |
| 4,366,539 | 12/1982 | Johnson et al. | 364/200 |
| 4,371,924 | 2/1983 | Schaefer et al. | 364/200 |

OTHER PUBLICATIONS

"Build a Microcomputer", Chapter II, p. 23, Advanced Micro Devices, Inc., 1978.
"Computer Architecture", C. C. Foster, pp. 232-256, 2nd ed., 1976, Litton Educational Publishing, Inc.
L. J. Scanlon, "The 6800: Principles and Programming", Chapter 6, 1981, Sams Publishing Co.
"Caps-6 Central Processing Unit", Rockwell International Corporation.

Primary Examiner—James D. Thomas
Assistant Examiner—William G. Niessen
Attorney, Agent, or Firm—Robert C. Mayes; George A. Montanye; H. Fredrick Hamann

[57] ABSTRACT

A circuit and technique of operation thereof are disclosed for a multimaster CPU system wherein a memory may be accessed during program operation in an average time less than that of the memory access time specification. This technique has particular usefulness in programs contained in relatively slow read-only-memory wherein a significant portion of the addresses related to memory are sequential. In optimum utilization, each master CPU has a dedicated PROM card which can only be enabled by the specified CPU. This configuration prevents additional master CPU's from interfering with the time saving benefits of early memory addressing.

1 Claim, 3 Drawing Figures

MULTIMASTER CPU SYSTEM WITH EARLY MEMORY ADDRESSING

BACKGROUND OF THE INVENTION

This invention relates to data processing electronics in general and more particularly to memory access techniques.

The development of the microcomputer and microprocessor or central processing unit (CPU) is essentially a history of technological advancement in increasing speed, accuracy, reduction in size and power of the various CPUs as they have evolved.

Throughput is a measure of the efficiency of a system or the rate at which the system can handle work. The speed at which problems or segments of problems are performed in a computer varies from application to application, and is meaningful only in terms of a specific application. Therefore, an increased throughput must necessarily consist of a comparison between the older slower method and the newer faster method while performing the same application.

Various methods of increasing throughput in given applications have been tried including pipelining as used in a "vector processor" such as the Texas Instruments Advanced Scientific Computer (ASC), the Control Data Corporation String Array Processor (STAR), and the Cray Research Corporation Cray 1. These machines utilize a technique for speeding up the throughput by having a plurality of stages perform one independent task on the instructions and then pass the instruction to the next stage for further processing. This is particularly applicable with a vector or matrix operator, hence the name "vector processor". This architecture, however, is prohibitively expensive in most applications and requires a significant hardware overhead.

A second type of pipelining is described in the Advanced Microdevices pamphlet entitled "Build a Microcomputer", Chapter II, page 23, which is incorporated herein by reference, where a pipeline architecture is described as overlapping the fetch of the next microinstruction while executing the current microinstruction. This is achieved by inserting additional registers in the overall path such that the signals can be held step by step. The advantages of this technique, however, are offset by the disadvantages of a relatively complex hardware system, particularly when the problem sought to be overcome is merely a memory access time slower than the optimum speed which the CPU is capable of handling. A second drawback is that the register described in that pamphlet is required as a component for machine operation, rather than merely an additional register added as desired for speed improvements.

An alternative method that may be used to increase throughput (as well a minimizing connections between the CPU and memory) is represented by the F-8 microprocessor family of devices manufactured by Fairchild. That throughput enhancement technique utilizes a hardware organization significantly different from typical CPU organization and requires the inclusion of addressing registers (program counter and data counter) and incrementers on the memory devices. Each memory device in the system must contain such registers, since the traditional address bus that typically links the CPU with memory is missing from the F-8 architecture.

A yet further alternative is the utilization of a cache or virtual memory system in a main-frame architecture utilizing a double or triple level hierarchy memory where the first level of memory is directly addressable by the CPU and is normally a fast memory as compared to a slow second level hierarchy main memory which is utilized for bulk memory storage and is normally not directly addressable by the CPU. In operation, the cache system addresses words or pages which have a probability of being required by the CPU and they are temporarily stored in cache. When the CPU calls for an address which is in cache, the memory response time is thus greatly enhanced; however, when the address is not in cache, the memory access time is the same or somewhat slower than the normal main memory access time. A number of algorithms for cache control have been developed and terms such as "hit ratio" refer to the algorithm's probability of success of providing a required address in cache to the CPU as compared to not having a required memory word in cache. Once again, however, these architectures (double or triple level hierarchy), are relatively expensive and are only justified in large relatively complex systems.

Additional methods of memory access speed-up related to computer architecture are discussed in chapter 10 of the book entitled "Computer Architecture", 2nd ed., by Caxton C. Foster, published by Van Nostrand, Reinhold company, 1976, That chapter, entitled "Very Large Computers" discusses among other techniques memory interleaving (which essentially is the fetching of multiple words simultaneously from independent memory modules); the instruction pre-fetch (look ahead), which is an instruction buffer memory which is loaded with the following instruction words when the bus memory system is not in use, and implies a second buffer or cache memory such as the pre-fetch technique described in U.S. Pat. No. 4,371,924, issued Feb. 1, 1983 to Marcus J. Schaefer et.al. which provides an excellent background for understanding a two-level hierarchy system and is hereby incorporated by reference; and the cache previously discussed.

One could properly assume, as the title to chapter 10, "Very Large Computers" , implies, tnat all of these techniques are substantially limited to large expensive architectures, and therefore are not suitable for solving the memory speed-up problems encountered in small compact and inexpensive systems.

SUMMARY AND BRIEF DESCRIPTION OF THE INVENTION

Accordingly, it is an object of the present invention to provide a memory addressing technique for shortening the access time of memories utilized in a small, inexpensive and/or space-limited computer system having a plurality of master CPUs.

Another object of the present invention is to provide a single level hierarchy memory access accelerator for use in a multimaster CPU system allowing slower memory units to be utilized effectively with a relatively faster central processing unit.

Briefly, and in accordance with the present invention, a data processing system comprises a plurality of central processing units cooperatively interconnected with a communication bus, a plurality of memory units coupled to the bus and at least one memory unit of said plurality of memory units capable of enablement by a single one of the plurality of central processor units, and at least one memory unit of said plurality having means for reducing access time to the memory unit by generating sequential memory addresses therein.

In a preferred embodiment, a system comprises a function control processor cooperatively interconnected to a display control processor. The distinct program requirements of the function control processor are met by a dedicated PROM card having a sequential memory address generator thereon for speeding up the function control processor's program. Additionally, the display control processor also has, in alternative embodiments, an additional sequential address generator on the PROM card dedicated to the display control processor for speeding up the display program of operation as well.

A data processing system having a single level hierarchy memory access accelerator in accordance with the present invention comprises means for providing a first memory address to a memory and for subsequently providing an additional address; means for sequentially changing the first address into a second memory address and presenting that second address to the memory; means for comparing the second address to the subsequently-provided additional address; and means for changing the address provided to the memory from the second address to the additional address in response to the means for comparing. The means for comparing in a preferred embodiment comprises a comparator circuit, and the hardware necessary to improve the operation of a memory unit coupled to a CPU having an at least partially-sequential address program, comprises essentially an address register which is normally required to maintain stable address inputs to a typical memory unit (such as an EPROM), an address generator (normally simply a counter circuit), and a comparator, all coupled to relatively straightforward control circuitry. Typical applications employ this invention as part of an instruction memory function utilizing PROMs, since instruction fetches tend to occur at sequential addresses, and relatively slow EPROMs are desirable for convenient programming.

A particularly advantageous novel feature of the present invention is the option of its being included on a first memory unit such as a memory board A dedicated to a first master CPU but not being included on a second memory board B dedicated to a second master CPU, such that the master having the invention on memory board A will receive the speedup advantage when addressing memory board A but not when addressing other memory units. Memory board B could be subsequently updated to include the present invention and provide the maximum capability to both master CPUs at very little additional cost.

Other novel features, objects and advantages of the invention will be apparent upon reading the following detailed description of an illustrative embodiment of the invention in conjunction with the drawings herein, in which.

DETAILED DESCRIPTION OF A PREFERRED EMBODIMENT

Figure 1:
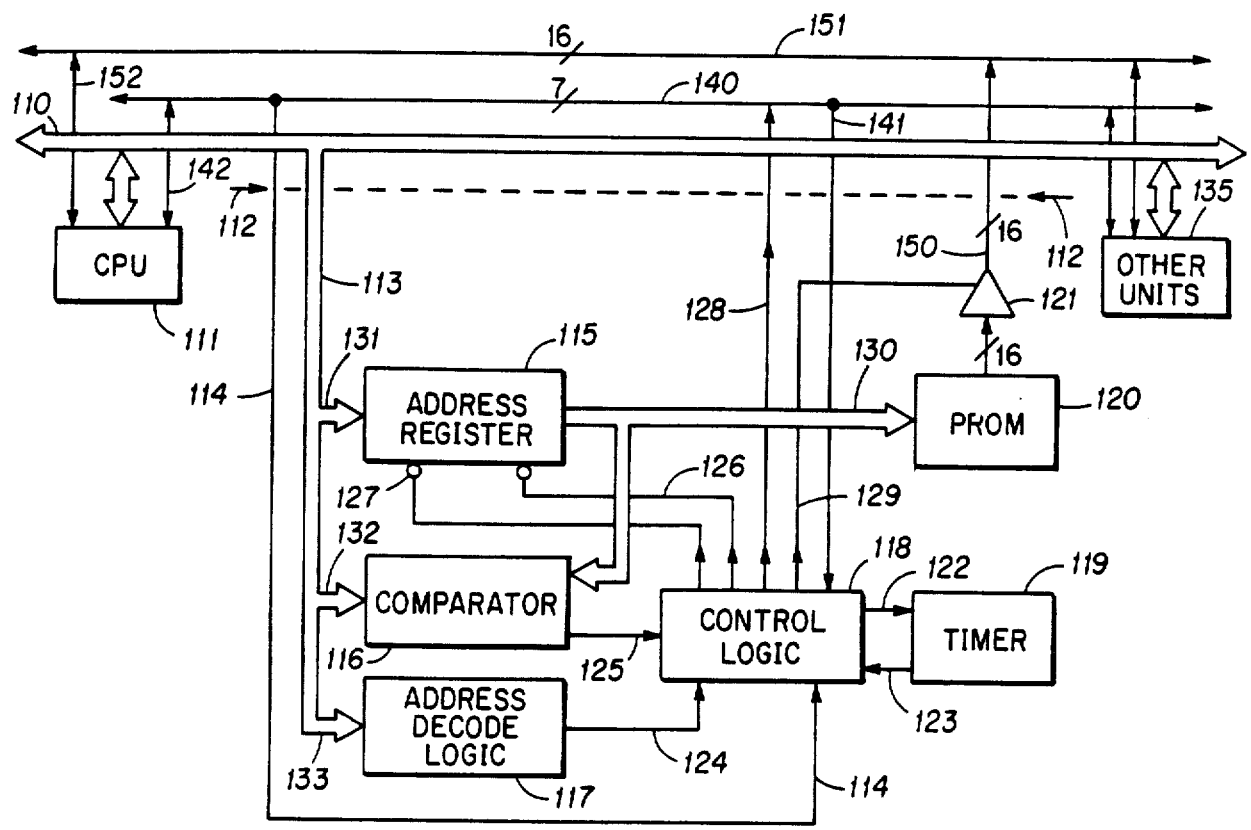
FIG. 1 is a schematic block diagram of one embodiment of the present invention.

Referring now to FIG. 1, CPU 111 is coupled to the asynchronous bus represented by address lines 110, data lines 151, and control lines 140 and has access to the memory unit designated by section line 112 in addition to other devices represented by block 135. In a typical application, the address and data signals may consist of 16 lines each and the control signals may consist of 7 lines. The address busses in FIG. 1 are drawn as double-wide signal paths to allow addressing flow to be more easily followed. Memory unit 112, which resides on a single card in a typical application, is coupled to address bus 110, data bus 151, and control bus 140 through bus 113, bus 150, and lines 114, 128, and 141, respectively. Three of the seven control bus lines are used by memory unit 112; these connections are line 114 which is a transfer request line to control logic block 118, reset line 141, and a transfer acknowledge line 128. Additional lines on control bus 140 are for purposes not associated with normal memory transactions, and are therefore not connected to memory unit 112. The 16-line data bus 151 is coupled both to CPU 111 through bus 152 and to the memory card through the 16-bit data bus 150. Gate 121 represents the bus drivers normally utilized to provide sufficient fan out to the data bus 151 and is controlled through line 129 by control logic block 118.

Additional monitoring units, I/O units, or other peripherals may additionally be connected to buses 110, 140 and 151 as is shown by block 135.

Asynchronous bus arrangements of the type used in this specification are known in the art; for example, the Motorola 68000 microprocessor allows asynchronous data transfers as shown in Chapter 6 of the text entitled "The 68000: Principles and Programming" by Leo J. Scanlon, Sams Publishing Co., 1981, and that chapter is incorporated by reference thereto. Pages 147 to 153 of that chapter describe asynchronous data transfer operation of the 68000 microprocessor manufactured by Motorola, Rockwell International Corporation, and others. A correspondence exists between the address strobe signal as discussed in the text and the transfer request signal as used herein, since both serve the same function.

In actual operation, an address from the CPU is provided on bus 110 and thereafter on bus 113 to address register 115. Simultaneously, the address decode logic 117 receives the four most significant bits, in one embodiment, through bus 133, of the address and provides a proper decode signal through line 124 to the control logic block 118. If the address register 115 does not already contain the desired addresses, control logic 118 provides a load signal through line 127 to the address register 115 resulting in the same address from the CPU being provided to the PROM 120 through bus 130. The PROMs utilized were INTEL 2716 EPROMs and have a nominal memory access time of approximately 450 nanoseconds. During this time, the control logic unit 118 is responsive to timer 119 and upon the completion of the access time (450 nanoseconds, in this example) as signalled on line 123, data is made available on bus 151 through bus drivers 121. Additionally, a transfer acknowledge signal is output on line 128 from the control logic unit 118 to the control line bus 140 signaling the CPU that the data on bus 151 is valid.

The transfer request signal on line 114 is removed upon receipt by the CPU of a transfer acknowledge signal and the control logic block 118 then increments the address register through line 126 to provide an artificially-generated address which is a single bit higher in address than that which was previously registered in the address register 115. That address is provided immediately to PROM 120 and timer 119 is triggered, through line 122.

After utilizing data supplied by the first address provided by the CPU, the CPU then typically provides a second address to the address register and that address, coupled with a proper address decode through the address decode logic block 117 and a transfer request on line 114 signals the control logic block 118 that another memory read is to be performed. This CPU-generated address is provided to the comparator 116 through bus 132 to compare through comparator 116, the previously artificially-generated address on bus 130 with the second CPU-generated address and, upon obtaining a positive compare signal on line 125, the control logic block 118 does not re-initiate timer 119 but instead allows timer 119 to continue running. Note that timer 119 was started when the address register 115 was incremented by the control logic block 118, and therefore the PROM 120 has had a significant time advantage to provide proper memory access in advance of receiving the second CPU address. If the second CPU address is in fact sequential to the first address, the time advantage in one application, is such as to reduce the apparent memory access time to the PROM from 450 nanoseconds to an average of approximately 100 nanoseconds. This reduced time is limited by two factors. First, timer 119 must time out to indicate data available from the memory, so a waiting time must result if a sequential location is accessed within 450 ns of completion of the previous transaction to this device. Secondly, even if timer 119 has timed out, some additional time must be allowed for logic delays within memory unit 112, since a non-zero time period is required to enable bus drivers and assert transfer acknowledge.

Alternatively, should the second CPU-generated address not be sequential, the comparator 116 provides a no-compare or "invalid" compare signal on line 125 to the control logic block 118 causing timer 119 to be started and the address register to be loaded with the second CPU-generated address on bus 131, and the CPU is required then to wait the full 450 ns memory access time before the data on data bus 150 is valid and the transfer acknowledge signal is sent on line 128.

In this manner, it can be seen that a CPU operated under essentially a sequential program will have an added speed advantage from the early memory addressing when the addresses are essentially sequential. The amount of speed improvement is a direct function of the sequentiality of the memory addresses.

Reset line 141 is not essential to circuit operation in typical applications, but may be useful for initializing circuitry in memory unit 112 for purposes such as testing, where a known initial condition is desired. Reset is also useful in applications where the first memory transaction may occur quickly after power-up, where a power-up reset is used to prevent random initial states of the address register, timer, and control circuitry from allowing a transfer acknowledge signal to be issued before valid data is available from the PROM.

Figure 2:
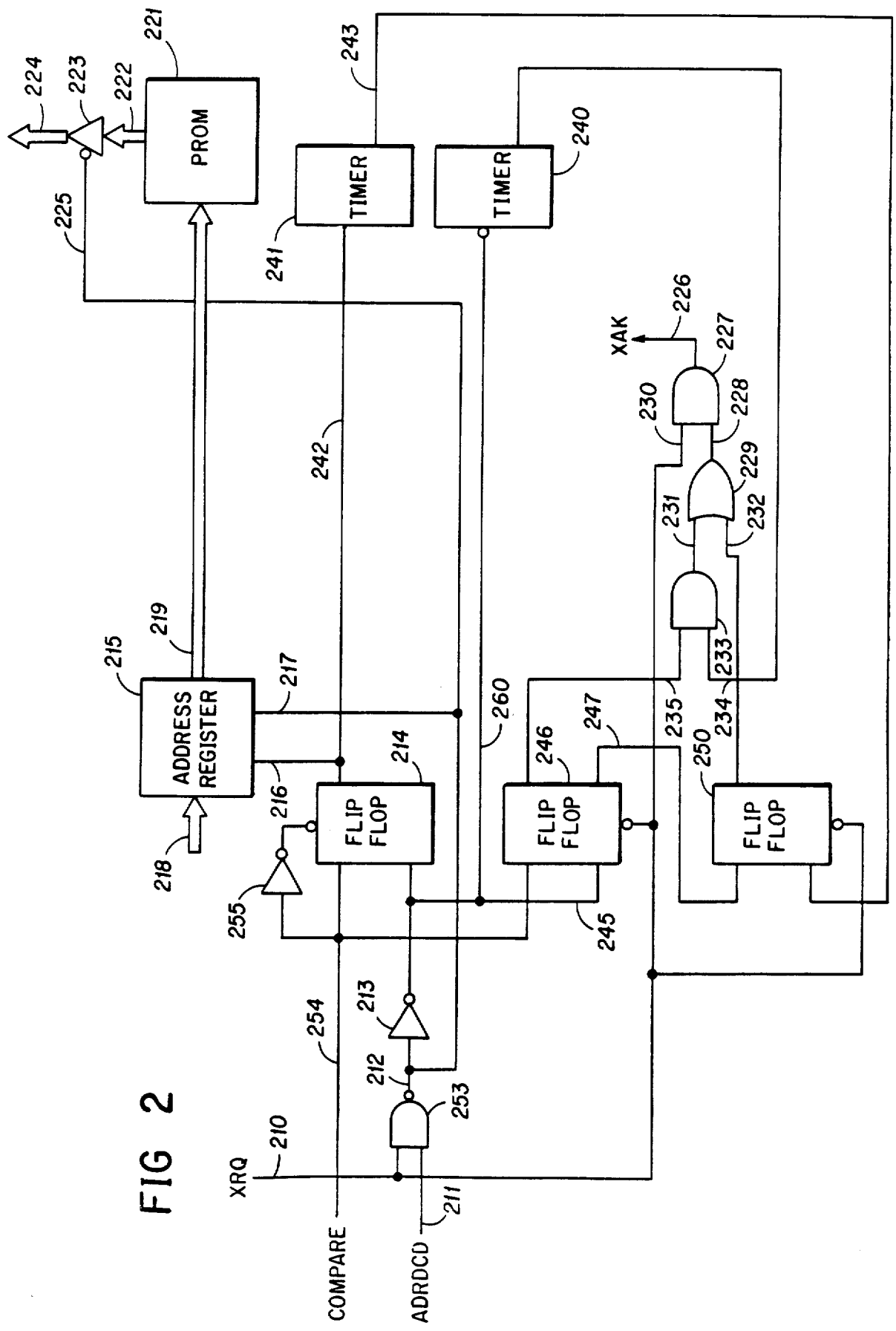
FIG. 2 is a detailed circuit diagram showing the major components connected in their proper relationships to perform the control logic function of the circuit shown in FIG. 1.

Referring now to FIG. 2, the control logic block of FIG. 1 is shown in a detailed circuit diagram wherein the transfer request line 210 is input into flip-flop 250, flip-flop 246, AND-gate 227 on line 230, and NAND-gate 253.

Address decode line 211 is NANDed with XRQ (transfer request), line 210, by gate 253 to form an active low signal on line 212 indicating that a valid address is present on the address bus, and that the memory word associated with that address is contained in PROM 221. This signal is input into inverter 213 and from the inverter into the clock input of flip-flop 214, timer 240 on line 260, and the clock input of flip-flop 246 on line 245. Additionally, the non-inverted address decode false signal on line 212 is input directly into the address register 215 to allow incrementing this register at the end of the transaction and into the bus drivers 223 shown as a single unit.

Operation of this circuit is best explained by describing operations performed for a non-sequential or miscompare case, followed by a sequential memory access example. In actual operation, the address is provided on bus 218 to address register 215 and an address decode signal input through NAND-gate 253 and inverter 213 clocks flip-flop 214 causing it to output a load signal into the address register on line 216 as well as a start-timing signal on line 242 to timer 241 for those cases where the compare signal on line 254 is low, indicating a miscompare.

The compare signal corresponds to the output of a comparator which compares bus 218 with bus 219. Address register 215 is asynchronously loaded by a low level signal on line 216; when the register is loaded with the desired address, the compare signal on line 254 will become high, setting the output of flip-flop 214 back to a high level through gate 255 and removing the load signal. Note that the active low load pulse on lines 216 and 242 will be short in duration, determined by logic delays through address register 215, the comparator corresponding to 116 in FIG. 1, inverter 255, and flip-flop 214. Components making up this path, along with timer 241, must be chosen with consideration given to timing parameters, to ensure that the pulse width from flip-flop 214 is adequate to properly trigger timer 241 while loading the address register. A pulse-stretching circuit may be added between the output of flip-flop 214 and lines 216 and 242 to provide a load pulse of required length. Timer 241 and timer 240 are both on a dual timer 54LS123 chip and both are set based upon the memory access speed which in the present example is 450 ns. Since some allowance must be made for tolerances in the timing circuitry as well as delays within the control logic, the time periods of timers 240 and 241 are set at approximately 550 ns, ensuring a minimum time of 450 ns, the access time of the INTEL 2716 devices used to make up PROM block 221. Although two timers are shown, only one is necessary for proper operation of the present invention and both were used solely for convenience in implementation. In this implementation, timer 240 times accesses based upon the generated expected next address, and timer 241 times accesses based upon CPU-furnished addresses when a miscompare occurs. Clocked logic (counters, etc.) may be used to replace these timers in other implementations.

Address register 215 having been loaded by flip-flop 214 is thus providing the CPU required address on address bus 219 to the PROM 221. When timer 241 times out, line 243 provides a clock signal to flip-flop 250, which has a logic "1" signal input on line 247 from the inverted output of flip-flop 246. Flip-flop 250 inputs to OR-gate 229 through line 232, a signal causing the AND-gate 227 having a transfer request signal on 230 and the OR-signal on line 228 to output a transfer acknowledge signal to the control bus of the CPU on line 226. At this time, the desired data is available from PROM 221 on bus 222, and the data bus driver 223, enabled by a low level on line 225, provides this data to the CPU through line 224. Timing specifications for the bus shown in this example require that transfer acknowledge be negated quickly after transfer request is negated by the CPU; this function is performed by AND-gate 227. Note that output 235 of flip-flop 246 will be low, and inverted output 247 will be high since the compare signal 254 was low when this flip-flop was clocked by line 245 at the beginning of the transaction. Therefore, the path through AND-gate 233 is incapable of asserting transfer acknowledge for miscompare cases.

At the end of the transaction, XRQ on line 210, goes false, forcing line 212 high through NAND-gate 253, disabling bus driver 223. The low-to-high transition on line 212, through line 217, increments address register 215 to the next sequential address. The PROM is now presented with the next sequential memory address and timer 240 is initiated to time but the sequential address memory access by a high-to-low signal transition on line 260.

Upon presentation of a second address from the CPU, a transfer request signal on line 210 and an address decode signal on line 211 are once again presented to the control logic circuit and additionally a valid comare signal 254 through inverter 255 sets flip-flop 214 and thus will not load address register 215 nor restart timer 241. Thus a valid compare signal allows PROM 221 to continue to run as timed by timer 240 to access the internally-generated sequential address previously provided as a function of the first address from the CPU. The high compare signal on line 254 additionally provides a logic "1" data input to flip-flop 246, clocked at the begining of the transaction by line 245, to provide a high signal on line 235 to AND-gate 233. When timer 240 has timed out the proper memory access time, line 234 transitions to a high level and AND-gate 233 inputs a high signal on line 231 into OR-gate 229 and once again provides the AND-gate 227 with a high signal on line 228 to output a transfer acknowledge signal on line 226. As before, the desired memory word is made available on data bus 224 through bus driver 223, which is enabled by a valid address decode false signal 212. When the transfer acknowledge signal is received by the CPU and the CPU has latched the data, transfer request 210 and the address are removed from the bus, forcing the address decode false signal 212 to a high level, causing bus drivers 223 to remove data from the data bus.

In this manner, the CPU presents a first address to the early memory addressing unit. The unit provides the data from that address and immediately thereafter begins to provide the data from the next sequential memory address location. If the next requested memory address from the CPU is in fact sequential to the first, the early memory addressing circuitry has provided an accelerated access time from the point of view of the CPU, and if the second CPU requested address is not sequential, there is no resultant penalizing delay other than logic delays associated the restarting the memory read.

In actual operation, various programs of varying degrees of sequentiality and memory requirements were run and improvements from 1 percent having a minimum of sequentiality to 18 percent in programs running in excess of 95 percent sequential memory addresses, were observed. It should be noted that 18 percent improvement in program run time is significant when viewed in light of the small amount of hardware required. Even if 50 percent of the addresses are non-sequential, an overall memory speed-up of 8-10 percent may be expected. If the memory constants which are called out frequently and typically in a non-sequential manner in a given program are removed to a separate constant memory, the remaining memory has the access time to it reduced by a significant amount.

Figure 3:
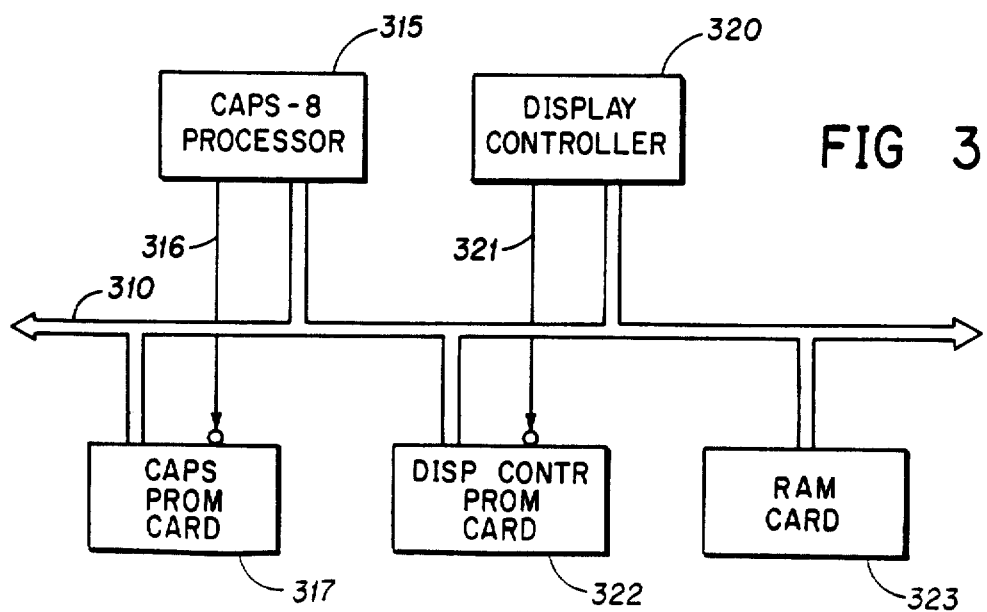
FIG. 3 is a schematic block diagram of a plurality of microprocessors coupled to an asynchronous bus and having separately controllable memory cards also coupled to the bus.

Referring now to FIG. 3, an alternative embodiment having two microprocessors, the CAPS-8 processor 315 and a display controller processor 320, both coupled to the bus 310 and through the master false control line 316, the CAPS-8 processor controls its separate PROM card 317 and the display controller 320 controls through its master false control line 321 the display controller's PROM card 322. This configuration allows the CAPS-8 processor, utilized in one embodiment of the invention, to operate on an essentially sequential program and have all of that program data stored on its own PROM card 317. Additionally, the display controller also may operate on an essentially sequential program independent on the CAPS-8 processor and have its own PROM card 322 controlled by a separate master false control line 321. The RAM card 323 is shared by both the CAPS-8 processor and the display controller for providing the computed monitoring data from the CAPS-8 processor to the display controller. The CAPS-8 processor noted in this description is similar to the CAPS-6 central processing unit described in the summary sheet titled "Collins Adaptive Processing System (CAPS) CAPS-6 Central Processing Unit", printed and distributed by Rockwell International Corporation. The CAPS-8 differs from CAPS-6 in that CAPS-8 resides on a single card and provides a more limited interrupt capability; however the CAPS-8, CAPS-6, and the 68000 microprocessors, as well as others, may all use the present invention to good advantage in essentially the same way.

The display controller is also a CAPS-8 processor, somewhat modified to perform display processing, and may also use the early memory addressing technique, if desired, to speed up the display program. Its connection, as well as other CPU's which are also useful in other implementations, is essentially the same as described herein for the CAPS-8 processor.

The PROM cards 317 and 322 are as described previously, except for an additional enable input connected to the master false lines 316 and 321 of devices 315 and 320. This enable input effectively becomes part of the address decode logic of the PROM card, allowing the card to respond to the specified address range when the desired master device is asserting the address. The master false line is asserted by a device only when that device has acquired bus mastership through a bus arbitration sequence which may typically utilize lines on a control bus similar to bus 140 in FIG. 1. Bus contention logic allowing acquisition of bus mastership by one of several possible masters sharing a bus is known in the art; an arrangement similar to the one described here may be used with the Motorola 68000 microprocessor as described beginning on page 155 of the previously-incorporated chapter of the Scanlon book.

There are two notable advantages to the configuration shown in FIG. 3 wherein the first is the utilization of the early memory addressing on both CAPS PROM card and the display controller PROM card which allows the significant speed advantage to the program of operation of both processors independently. If only one of the PROM cards has the early memory addressing invention thereon, the overall function of the entire system is still improved by the speed advantage of the respective processor having the early memory addressing. The first advantage of the shown configuration is that the memory addresses of both PROM cards may be numbered from zero to 64K words without interfering one with the other. This is the result of having separate master false control lines for each card, and when the CAPS-8 processor is designated master by bus contention logic, the CAPS-8 processor enables its own PROM card 317 and accesses that data which is required without having a larger number of bus lines and higher addressing requirements. Thus, for programming convenience, the RAM card addresses may be designated from 20K to 32K, for example, and both the display controller 320 and the CAPS-8 processor can have access to those addresses when they are designated master, respectively.

The second key advantage is the non-enablement of the display controller's PROM card 322 when the CAPS-8 processor 315 is the master and has output an address on bus 310. The sequential early memory addressing function of the display controller PROM card 322 therefore is not triggered by a proper address decode and address to the card 322 by an address originating from the CAPS-8 processor 315. This enables the full speed-up advantage of the early memory addressing to be attained and additionally lowers the number of memory addresses that must be used in a multiple processor unit such as the one shown.

A peripheral as used in this specification is essentially any device other than the main CPU that can input an address onto the address bus. This includes cache controllers, tape drives, and additional processors on the bus as is shown in FIG. 3. While the embodiment in FIG. 3 discloses a dedicated memory card for each of the CPUs, alternative embodiments have one dedicated PROM card having the present invention coupled to a CPU or peripheral, and additional memory cards having the present invention but not operated in a dedicated manner. As previously discussed, dedicated memory cards allow the maximum benefit in the specified example; however non-dedicated memory cards utilizing the present invention can be used to good benefit by a plurality of processing units and peripherals by time-sharing bus mastership in a manner allowing multiple memory accesses by the same master during the same block of time.

Implementation of the present invention on a single substrate to form an integrated circuit is useful in at least two distinct configurations: one embodiment has the early memory addressing circuitry integrated directly on a memory chip substrate such that all the required circuitry to implement the present invention is incorporated directly on the memory chip and therefore an essentially sequential program read out of such an improved memory would receive a significant apparent memory access time. In an alternative configuration, the early memory addressing circuitry is provided without actual memory other than the address register necessary for the proper operation of the comparator, as an interface chip for an already-existing memory such as the 2716 EPROM.

It should be noted additionally that the present invention is a way of speeding up a single level hierarchy memory, and additionally will find ready implementation in two-level or three-level hierarchy systems wherein the present invention is utilized to accelerate memory access at one of the hierarchy levels.

While this invention has been described with reference to various illustrative embodiments, it is not intended that this description should be construed in a limiting sense. Various modifications of the illustrative embodiments as well as other embodiments of the invention will be apparent to persons skilled in the art upon reference to this description. It is therefore contemplated that the appended claims will cover any such modifications of embodiments as fall within the true scope of the invention.

We claim:

1. A data processing system comprising in combination:
   a. a plurality of central processing units interconnected via a bus;
   b. a plurality of memory units interconnected via said bus to said central processing units; and
   c. at least one of said memory units comprising a sequential memory address generator and said at least one of said memory units being enabled by a single one of said plurality of central processing units and having a means to receive and store a first memory address and a second subsequent memory address, respectively, therefrom, wherein said at least one memory unit further comprises:
      i. a sequential and artificial memory address generator for generating a sequential memory address, which is a single least significant bit different from said first memory address received, and directly applying said sequential memory address to said memory in anticipation of receipt of said second memory address from one of said plurality of central processing units;
      ii. means for comparing said second received memory address from one of said plurality of central processing units to said sequentially generated memory address; and
      iii. means for allowing said direct application of said sequential memory address to continue as a function of a correct compare of said second received memory address with said sequentially generated memory address.

* * * * *